United States Patent [19]

Bacardit et al.

[11] Patent Number: 4,685,301

[45] Date of Patent: Aug. 11, 1987

[54] HYDRAULIC PRESSURE GENERATOR

[75] Inventors: Juan S. Bacardit; Carlos M. Folch, both of Barcelona, Spain

[73] Assignee: Bendiberica S.A., Barcelona, Spain

[21] Appl. No.: 910,287

[22] Filed: Sep. 17, 1986

Related U.S. Application Data

[63] Continuation of Ser. No. 729,842, May 2, 1985, abandoned.

[30] Foreign Application Priority Data

May 22, 1984 [ES] Spain ................................. 532679

[51] Int. Cl.⁴ ............................................. B60T 11/20
[52] U.S. Cl. ...................................... 60/562; 60/589; 92/169
[58] Field of Search ................. 60/562, 588, 589, 533, 60/585; 92/169.1

[56] References Cited

U.S. PATENT DOCUMENTS

| | | | |
|---|---|---|---|
| 3,159,974 | 12/1964 | Rodgers | 60/562 |
| 3,729,932 | 5/1973 | Nakashima | 62/562 |
| 4,161,105 | 7/1979 | Hagiwara | 60/589 |
| 4,475,338 | 10/1984 | Gaiser | 60/589 |
| 4,503,677 | 3/1985 | Crumb | 60/589 |
| 4,514,982 | 5/1985 | Bach | 60/589 |
| 4,524,585 | 6/1985 | Coll | 60/589 |

FOREIGN PATENT DOCUMENTS

| | | | |
|---|---|---|---|
| 0032271 | 3/1978 | Japan | 60/562 |
| 2067251 | 7/1981 | United Kingdom | 60/562 |

Primary Examiner—Abraham Hershkovitz
Attorney, Agent, or Firm—Larry J. Palguta; Ken C. Decker

[57] ABSTRACT

The piston of the generator (6, 8) has a smooth lateral surface and cooperates in sliding sealing engagement with a pair of seals (9a, 9b) fixedly mounted in annular grooves formed in the interior surface of the single bore (2) of the tubular body (1) of the generator. The bore opens at either end of the body and comprises, in its interior surface, at least one longitudinal groove (17) extending over the entire length of the bore, the bore being closed at one end by an obturator element (4) fitted onto the body (1).

24 Claims, 4 Drawing Figures

HYDRAULIC PRESSURE GENERATOR

This is a continuation of abandoned application Ser. No. 729,842, filed May 2, 1985.

The present invention relates to hydraulic pressure generators, particularly for clutch or braking systems in automotive vehicles, and more particularly to a hydraulic pressure generator or master cylinder of the type comprising a body formed with a single bore wherein is slidingly mounted at least one piston delimitating within the bore a pressure chamber in permanent communication with a hydraulic utilizing circuit, the piston having a smooth lateral tubular surface and a front end forming a peripheral fluid passage and cooperating in sealing sliding engagement with a pair of annular seals fixedly mounted in annular grooves formed in the interior surface of the bore, between which seals there opens a passage for establishing communication between the pressure chamber and a reservoir, at least one longitudinal groove being formed in the interior surface of the bore over a portion of the axial length of the pressure chamber up to the corresponding communication passage.

A pressure generator, e.g. master cylinder, of this class is disclosed in U.S. Pat. No. 4,524,585 the contents of which are incorporated here for reference. The arrangement of the longitudinal groove, of the pairs of seals and of the front end of each piston forming a peripheral fluid passage, as described in this document, offers the advantage of permitting a substantial reduction in the overall length of the master cylinder. However, it has been found that forming the longitudinal groove over a portion of the length of each chamber and of the annular grooves of the seals, particularly for the secondary piston, has given rise to production problems.

One object of the present invention is to make improvements to such pressure generators, enabling the manufacturing costs to be reduced without affecting the reliability and compactness of the pressure generator.

To meet this object, according to a feature of the invention, the bore passes through the body of the master cylinder from end to end, and the longitudinal groove extends over the entire length of the through bore, the pressure chamber having a bottom (opposite to the piston) formed by an obturator element fixed onto the body, advantageously screwed in a leaktight manner into a threaded end of enlarged diameter of the through bore of the body.

It has been found that such an arrangement of pressure generator has also made it possible, in the case of a tandem pressure generator e.g. master cylinder, to greatly simplify the retaining means for the secondary piston, with particular reference to the great ease of integration permitted by the simplified structure of the pistons.

Another object of the present invention is therefore likewise to reduce the assembly costs of such a tandem master cylinder, by proposing a simple, safe and reliable internal arrangement, the manufacturing costs of which are likewise reduced.

In order to achieve this, according to another feature of the invention, in a tandem master cylinder with two axially spaced pistons within the single bore, comprising a first spring between the two pistons, a second spring between the secondary piston and the bottom of the secondary chamber, and a stop means for retaining the secondary piston in its rest position, this stop means comprises a tubular cage fixed on the obturator element, through which cage there extends, slidingly, a central extension portion of the secondary piston having a terminal head which cooperates in bearing engagement, in the rest position, against an end which is bent down towards the interior of the cage.

According to yet another feature of the invention, contributing to the reduction of manufacturing and assembly costs and ensuring a perfectly defined position of rest of the secondary piston, the cage is formed, at its end opposite to the end which is bent down towards the interior, with a radially outwardly extending mounting flange forming a bearing surface for the second spring, the cage being fixed to the obturator element by the outer periphery of this flange.

Other features and advantages of the present invention will be apparent from the following description of embodiments which are given by way of illustration but not implying any limitation, the said description being related to the attached drawings, wherein.

In the description which follows and in the drawings, identical or similar elements bear the same reference numbers, indexed if necessary.

Figure 1:
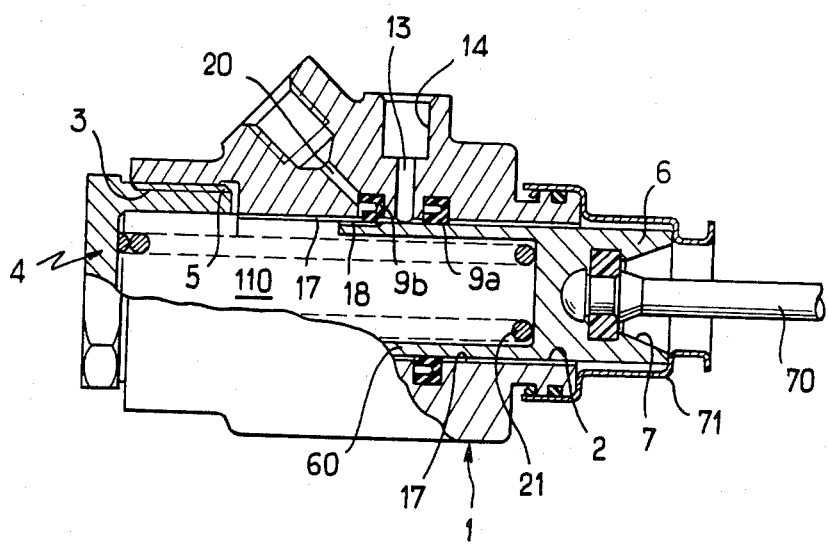
FIG. 1 is a view in longitudinal cross-section of a pressure generator according to the invention.

The hydraulic pressure generator generally comprises a tubular body 1 through which extends longitudinally a single bore of constant diameter 2 terminating, at one end, in a threaded end of enlarged diameter 3 intended to receive an obturator element 4 having a peripheral thread 5 cooperating with the female thread 3. In the bore 2 is located at least one piston 6 formed, at one end, with an internal cavity 7 for receiving an actuating rod 70 and having a general tubular configuration. The piston has a smooth lateral peripheral tubular surface and cooperates in sealing sliding engagement with a pair of axially spaced annular seals 9a, 9b which are fixedly mounted in annular grooves formed in the interior surface of the bore 2. The piston 6 thus defines, within the bore 2, a pressure chamber 110 (limited at one end by the obturator element 4). Into the bore 2 opens, between seals 9a, 9b, a fluid flow passage 13 intended to be connected, via a fitting 14, to a hydraulic fluid reservoir (not shown).

According to a feature of the invention, in the interior surface of the bore 2 there are formed at least one, typically at least two, and usually four longitudinally extending grooves 17 of reduced width which extend each all over the entire axial length of the bore 2 and open at the two ends of the bore. The piston 6 is formed, at its forward end opposite to the rod 70, with a peripheral chamfer or with short axial grooves 18 which constitute, with the axial grooves 17 in the bore 2, a compensation or dilatation fluid flow passage between the pressure chamber 110 and the inlet passage 13. The pressure chamber 110 is in permanent fluid flow communication with an hydraulic utilizing (brake or clutch) circuit (not shown). In the embodiment of Figure 1, the outlet orifice 20 of the pressure chamber 110 opens into the front portion of the annular groove of the front seal 9b, whereby being in permanent fluid communication with the pressure chamber via the longitudinal grooves 17 irrespective of the axial position of the piston 6 in the bore 2. The piston 2 cooperates with a return spring 21 arranged within the pressure chamber 110, having one end housed within a central recessed portion of the piston 6 and bearing by the other end against the obturating member 4. In this embodiment, the piston 6 is retained within the bore 2 by an outer tubular housing 71 mounted on the rear end of the body 1.

Figure 2:
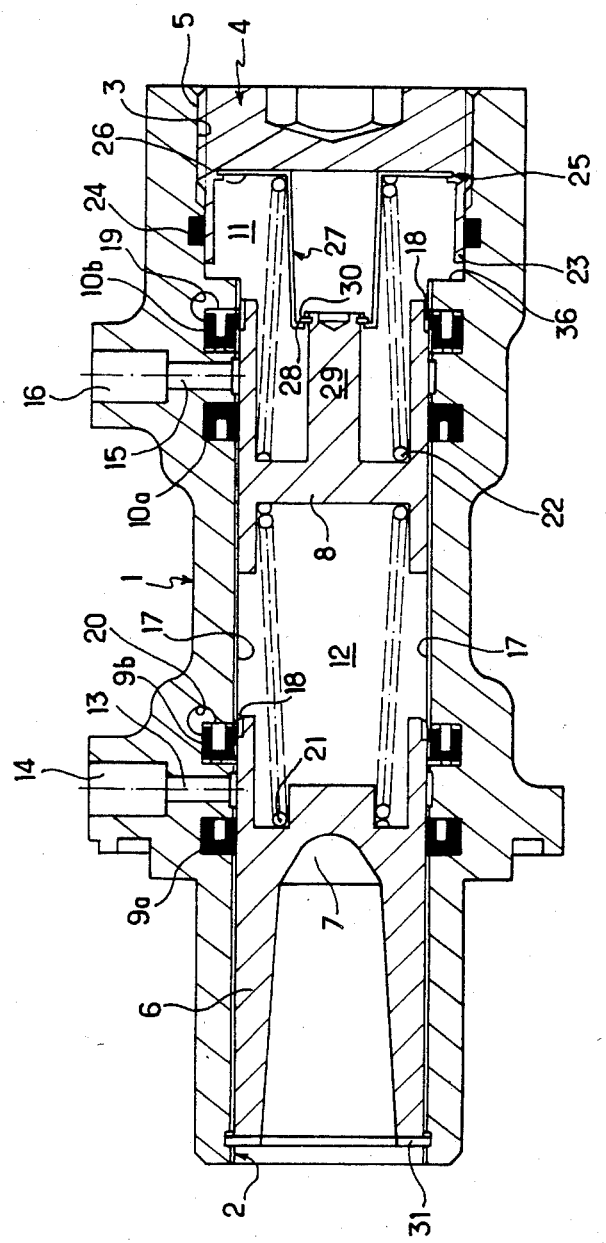
FIG. 2 is a view in longitudinal section of a first embodiment of a tandem master cylinder according to the invention.
Figure 3:
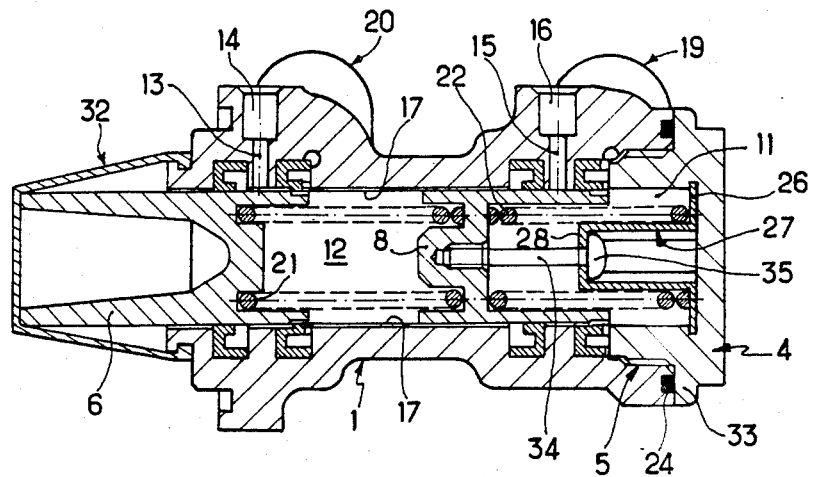
FIG. 3 is a view in longitudinal section of a second embodiment of a tandem master cylinder according to the invention.
Figure 4:
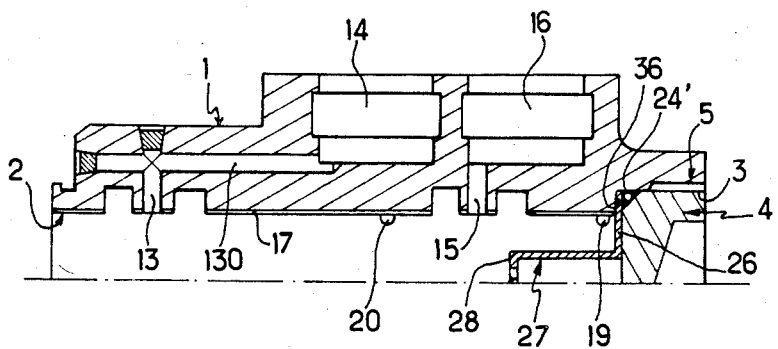
FIG. 4 is a half-view in longitudinal section of another embodiment of a tandem master cylinder housing according to the invention.

There are shown in FIGS. 2 to 4 different embodiments of compact tandem master cylinders according to the invention. Each tandem master cylinder similarly comprises a single axially transversing bore 2 provided with longitudinal grooves 17 extending all over the axial length of the single bore 2 within which are slidingly received axially spaced primary 6 and secondary 8 pistons, each conforming to piston 6 as per the embodiment in FIG. 1. The secondary piston 8 thus delimitates in the bore 2 a secondary pressure chamber (delimitated at its other end by the obturator member 4), and a primary pressure chamber 12 (delimitated, at the end opposite the obturator element 4, by the primary piston 6), the two pressure chambers being hermetically separated one from the other. Between the seals 9a and 9b of the primary piston there open into the bore 2 a passage 13 intended to be connected, by a fitting 14, to a hydraulic brake fluid reservoir (not shown). In a similar manner, between the seals 10a and 10b, there opens into the bore 2 a communicating passage 15 intended to be connected, via a fitting 16, to the reservoir (or to a separate reservoir). Each piston 6 or 8 is also formed, at its forward end, with short grooves or a peripheral chamfer 18 forming, with the longitudinal grooves 17, a compensation of expansion passage between the corresponding pressure chamber (11 or 12) and the corresponding communication passage (15 or 13). Each pressure chamber, 11 or 12, is in permanent communication with a respective braking circuit. In the example shown in FIG. 2, as in the embodiment of FIG. 1, the outlet passages 19 and 20 of the chambers 11 and 12 towards the respective brake circuits terminate in line with the forward face of the forward seal (9b, 10b) of each pair of seals, so as to thus communicates permanently, via the longitudinal grooves 17, with the corresponding pressure chamber. In the embodiment of FIG. 4, the passages 19 and 20 terminate in the respective chambers 11 and 12 in the vicinity of the bottom of the latter, likewise in communication with at least one of the longitudinal grooves 17. Between the two pistons 6 and 8 there is arranged, in the primary pressure chamber 12, a first spring 21, the ends of which are accommodated in a central recess in the secondary piston 8 and bearing against the obturator member 4.

In the embodiment shown in FIG. 2, the obturator member 4 comprises a forward tubular extension 23 cooperating peripherally with the end portion (of enlarged diameter) of the bore 2 and is provided with an annular gasket 24. Adjacent the junction zone between the tubular extension 23 and the bottom of the obturator member 4 there is provided an annular groove 25 in which is resiliently engaged, by its periphery, an annular radially outwardly extending flange 26 of a tubular cage 27 which protrudes axially into the secondary chamber 11 and, partly, into the central recess of the secondary piston 8. The end of the cage 27 opposite to the flange 26 forms an annular flange which is bent radially inwardly 28 and defines a central aperture through which there extends freely a central cylindrical extension 29 of the secondary piston 8, formed in one piece with the latter in the embodiment of FIG. 2. A circlip 30 is mounted on the outer end of the central extension 29 and cooperates normally in abutment with the flange 28 in the rest position of the pistons 6 and 8, towards which position these latter are biased by the springs 21 and 22. In the embodiment of FIG. 2, the primary piston 6 is held in the rest position by an annular ring 31 mounted in that end of the bore 2 which is opposite to the obturator member 4. It will be understood that, with an arrangement of this type, the longitudinal grooves 17 can readily be formed in the bore 2, for example by simple broaching, while the annular grooves receiving the seals 10a and 10b of the secondary piston can readily be machined from that end of enlarged diameter of the bore 2. During assembly, the obturator member 4/cage 27/spring 22/secondary piston 8 sub-assembly can readily be installed in position within the body 1, the cage 27 forming, by means of its flange 26, the forward bearing surface for the spring 22 and also a guide bush for the latter, and precisely determining the rest position of the secondary piston 8, irrespective of tolerance variations in the calibration of the springs 21 and 22.

The embodiment shown in FIG. 3 differs from that just described in that it comprises, as in the embodiment of FIG. 1, an extra-short body 1, beyond which the rear end of the primary piston 6 partially projects, the latter being held in place, against the elastic bias of the intermediate spring 21, during transport and before connection to the actuating rod (typically integrated within a pneumatic assistance booster), by a removable hood 32 mounted on that end of the body 1 which is opposite the obturator member 4. The obturator member 4 is formed here with a part forming a radially outwardly extending flange 33 which comes to bear against an annular end bearing face of the body 1 which is provided with the gasket 24. In this embodiment, the central extension of the secondary piston 8 is formed by a bolt 34 screwed into the piston 8 and provided with a terminal head 35 accommodated in the tubular cage 27 and cooperating in abutment with the end flange 28 of the cage.

In the embodiment shown in FIG. 4, the obturator member 4 has no forward tubular extension and the assembly flange 26 of the cage 27 is secured between the front face of the obturator member 4 and the junction shoulder 36 between the bore 2 and the threaded part of increased diameter 3, a gasket 24' being interposed in this area between the flange 26 and the front face of the obturator member 4. In this embodiment, which corresponds to a master cylinder intended to be partly integrated within a pneumatic assistance booster, the communication passage 13 opening into the bore 2 to establish communication between the primary chamber and the reservoir includes a portion 130 formed longitudinally in that end of the body 1 which is opposite the obturator member 4 and is intended to be integrated into the above-mentioned pneumatic booster.

Although the present invention has been described in relation to particular embodiments, it is not limited thereby, but is on the contrary capable of modifications and alternative forms which will be apparent to those skilled in the art.

We claim:

1. A hydraulic pressure generator, comprising a single piece housing formed with a bore having a cylindrical inner wall of constant inner diameter, a first piston having a smooth peripheral surface slidably engaging said inner wall and movable relative to a first pair of axially spaced fixed sealing rings fastened in annular grooves of the inner wall, said piston having a front portion delimitating in said bore a first pressure chamber communicating permanently with a hydraulic circuit via an outlet passage, an inlet passage opening into said bore between said annular grooves and connected to a fluid feed reservoir, and longitudinal slots formed in said cylindrical inner wall and extending axially between said inlet and outlet orifices, the longitudinal slots each having a width less than the circumference of said bore, the improvement wherein the bore extends from a first opening at one end of the housing to an enlarged diameter section at the other end of the housing, said longitudinal slots formed continuously so as to extend axially over the entire length of the bore from the first opening to the enlarged diameter section, said first pressure chamber closed by a separate obturator member secured in the enlarged diameter section of said housing, and said outlet passage formed partly by a radially outermost portion of one of said annular grooves which communicates with said pressure chamber via at least one of said longitudinal slots, the outlet passage communicating with a portion of the one annular groove which communicates with the one slot free of any obstruction by the respective sealing ring so that fluid flows freely past the sealing ring without obstruction thereby.

2. The generator of claim 1, wherein said outlet passage opens into said longitudinal slots.

3. The generator of claim 1, further comprising a first compression spring between said obturator member and said piston, and stop means for retaining said piston in a rest position.

4. The generator of claim 3, wherein said stop means is mounted on said housing at a housing end opposite said obturator member.

5. The generator of claim 3, further comprising a second piston axially separated from said first piston and having a smooth peripheral surface slidably engaging said inner wall and movable relative to a second pair of axially spaced sealing rings, said first and second pistons delimitating between them a second pressure chamber having associated outlet and inlet passages.

6. The generator of claim 5, wherein the inlet passage of the second chamber comprises a portion which extends longitudinally within the housing.

7. The generator of claim 5, further comprising a second compression spring in the second chamber between the pistons, a tubular cage connected to the obturator member and through which cage slidingly extends a central extension portion of the first piston formed with a terminal head cooperating in bearing engagement, in a rest position of said first piston, against an inwardly bent end portion of the cage.

8. The generator of claim 7, wherein the cage comprises, at an end opposite said inwardly bent end portion, a radially outwardly extending mounting flange forming a bearing surface for the first spring.

9. The generator of claim 8, wherein the cage is fixed to the obturator member by an outer peripheral portion of said mounting flange.

10. The generator of claim 9, wherein the outer peripheral portion of the mounting flange is engaged in an inner annular groove in the obturator member.

11. The generator of claim 7, wherein the central extension portion of the first piston is formed integral with the first piston.

12. The generator of claim 9, wherein the outer peripheral portion of the mounting flange is held between the obturator member and a radial shoulder of the housing.

13. A hydraulic pressure generator, comprising a single piece housing formed with a bore having a cylindrical inner wall of constant inner diameter, a first piston having a smooth peripheral surface slidably engaging said inner wall and movable relative to a first pair of axially spaced fixed sealing rings fastened in annular grooves of the inner wall, said piston having a front portion delimitating in said bore a first pressure chamber communicating permanently with a hydraulic circuit via an outlet passage, an inlet passage opening into said bore between said annular grooves and connected to a fluid feed reservoir, and at least one longitudinal slot formed in said cylindrical inner wall and extending axially between the inlet and outlet orifices, the longitudinal slot having a width less than the circumference of said bore, the improvement wherein said bore extends through to each axial side of the housing, said longitudinal slot formed continuously so as to extend over the entire length of the bore, said first pressure chamber closed by a separate obturator member secured to said housing, said outlet passage formed partly by a radially outermost portion of one of said annular grooves which communicates with said pressure chamber via said longitudinal slot, the outlet passage communicating with a portion of the one annular groove which communicates with the slot free of any obstruction by the respective sealing ring so that fluid flows freely past the sealing ring without obstruction thereby.

14. The generator of claim 13, wherein said outlet passage opens into said longitudinal slot.

15. The generator of claim 13, further comprising a first compression spring between said obturator member and said piston, and stop means for retaining said piston in a rest position.

16. The generator of claim 15, wherein said stop means is mounted on said housing at a housing end opposite said obturator member.

17. The generator of claim 15, further comprising a second piston axially separated from said first piston and having a smooth peripheral surface slidably engaging said inner wall and movable relative to a second pair of axially spaced sealing rings, said first and second pistons delimitating between them a second pressure chamber having associated outlet and inlet passages.

18. The generator of claim 17, further comprising a second compression spring in the second chamber between the pistons, a tubular cage connected to the obturator member and through which cage slidingly extends a central extension portion of the first piston formed with a terminal head cooperating in bearing engagement, in a rest position of said first piston, against an inwardly bent end portion of the cage.

19. The generator of claim 18, wherein the cage comprises, at an end opposite said inwardly bent end portion, a radially outwardly extending mounting flange forming a bearing surface for the first spring.

20. The generator of claim 19, wherein the cage is fixed to the obturator member by an outer peripheral portion of said mounting flange.

21. The generator of claim 20, wherein the outer peripheral portion of the mounting flange is engaged in an inner annular groove in the obturator member.

22. The generator of claim 18, wherein the central extension portion of the first piston is formed integral with the first piston.

23. The generator of claim 20, wherein the outer peripheral portion of the mounting flange is held between the obturator member and a radial shoulder of the housing.

24. The generator of claim 17, wherein the inlet passage of the second chamber comprises a portion which extends longitudinally within the housing.

* * * * *